United States Patent Office 3,122,050
Patented Feb. 25, 1964

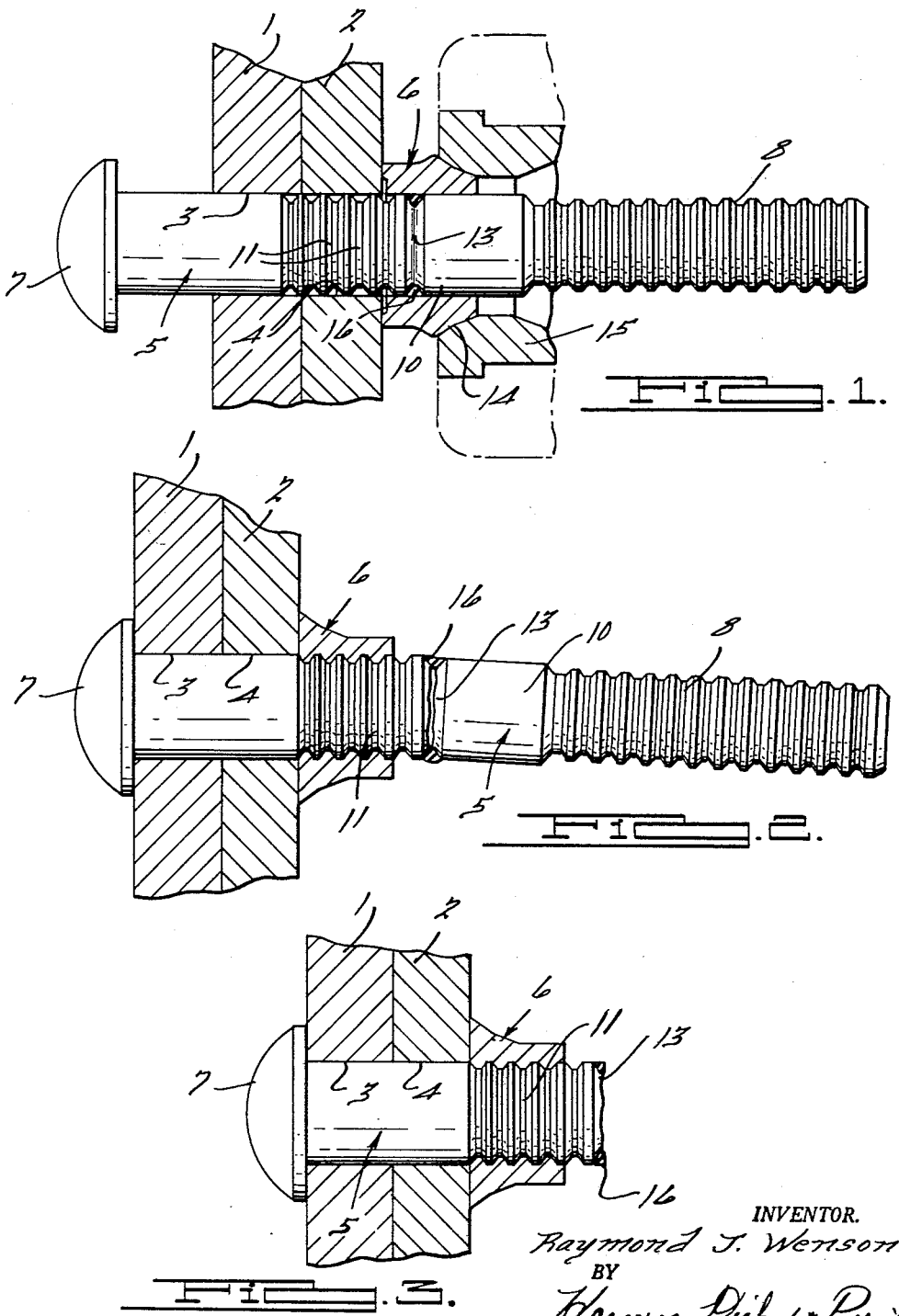

3,122,050
LOCK-BOLT PIN HAVING RETAINING MEANS BONDED IN THE BREAK-OFF GROOVE
Raymond J. Wenson, Detroit, Mich., assignor to Huck Manufacturing Company, Detroit, Mich., a corporation of Michigan
Filed Oct. 9, 1961, Ser. No. 143,785
1 Claim. (Cl. 85—5)

The present invention relates to improvements in lock-bolt fasteners of the type disclosed in Huck Patents Nos. 2,531,048 and 2,531,049.

Fasteners known as lock bolts are two-part fasteners comprising a pin and a collar in which the pin has a preformed head at one end, pull means at the opposite end, a break neck on the pin adjacent the pull means, and a locking groove or grooves between the break neck and the head. The pin also comprises a smooth, cylindrical portion between the pull grooves and the head, which cylindrical portion is received within the openings in the parts secured together.

The pin passes through openings in sheets to be held together and the collar is disposed over the pin to engage the sheet on the opposite side to the pin head. The collar is swaged into the locking grooves by a setting tool well known in the art. Such tool (not shown) includes jaws which engage the pull grooves on the pin and an anvil which engages the collar. The pin is pulled by the jaws and a reaction force applied against the collar by the anvil to force the collar into the locking grooves. When the collar is completely swaged, the pressure builds up to break the pin at the break neck, leaving a separated pintail. The pintail is ejected by the pull tool and usually falls onto the floor or other surface adjacent the workpiece.

With the development of the lock bolts, the disposal of the pintail has become an increasingly serious problem. Lockbolt pins are now made in large sizes from one-half inch to one inch in diameter and the pintails are of considerable weight and are dangerous when dropped.

According to the present invention, an elastic means is secured to the pin on opposite sides of or within the break neck so that when the pintail is separated from the remaining portion of the pin and ejected from the driving tool, the pintail will be held to the set fastener and will not drop to the floor or to an adjacent surface or into the work. A rubber material may be vulcanized to the pin within the break neck and is of such strength to support the pintail against accidental falling off, but is of sufficient weakness that the pintail may be deliberately pulled from the fastener, breaking the elastic connection. Thus a number of the pins could be set, leaving the pintails connected to, but hanging from, the fastener and later removed with safety by being pulled from the fastener.

One of the primary objects of the present invention is to provide an improved lock-bolt pin of such construction as to eliminate the dangers of pintails falling either into inaccessible parts of the work or onto workmen underneath, or onto the floor or adjacent surface where they become a possible cause of accident.

Other objects of the invention will become apparent from the following description, the drawings relating thereto, and from the claims hereinafter set forth.

In the drawings, in which like numerals are used to designate like parts in the several views throughout:

FIGURE 1 is a longitudinal and cross-sectional view of a fastener of the present invention showing such fastener in position ready to be set into a workpiece;

FIG. 2 is a view similar to FIG. 1 at the completion of the setting of the fasteners; and FIG. 3 is a view similar to FIG. 2 with the pintail removed.

Referring to the drawings, the fastener of the present invention is shown as being applied to secure sheets or panel members 1 and 2 together through aligned openings 3 and 4. The lock-bolt fastener comprises a pin generally indicated at 5 and a collar generally indicated at 6. The pin 5 has a preformed head 7 formed at the end of the major stem portion thereof. The stem portion has pull grooves 8 formed on the end opposite the head, a cylindrical shank portion 10, a plurality of locking grooves 11, and a break neck 13 disposed between the cylindrical portion 10 and the lock grooves 11.

The collar 6, which is generally tubular in form, has a central opening which is disposed over the pin and is formed with an annular hold-off shoulder 14 which is adapted to be engaged by an anvil 15 of a driving tool (not shown). The collar 6 may have other configurations, the one shown being merely for the purpose of illustration.

According to the present invention, an elastic material, such as rubber, is vulcanized to the pin within the break neck 13 as indicated at 16. Thus a rubber ring is disposed within the break neck 13 and vulcanized to both sides thereof.

As stated above, the fastener is set by pulling the pin to the right (viewing FIG. 1), and a reaction force is applied by the anvil 15 against the collar 6. Pulling continues until the collar is swaged into final position, as shown in FIG. 2, and thereafter the force builds up to the point that the pin is broken at the break neck 13, thus separating the pintail from the remaining part of the fastener at the break neck, as shown in FIG. 2. The elastic ring 16 holds the pintail to the fastener as shown, even though the pin parts are separated. The pintail will remain in such position until it is deliberately removed by a pulling force which will readily break the elastic connection 16, leaving the fastener in its completed setting as shown in FIG. 3.

Formal changes may be made in the specific embodiment of the invention disclosed without departing from the spirit and substance of the invention, the scope of which is commensurate with the appended claim.

What is claimed is:

A lockbolt pin having a head and shank extending therefrom, said shank comprising a circumferentially grooved fastening portion integrally connected by means of an annular break-neck groove to a circumferentially grooved pintail portion, nonmetallic elastic means bonded to said fastening portion and said pintail portion within said break-neck groove to hold said fastening and pintail portions together when they are broken apart at the break-neck groove, said elastic means being breakable so that said fastening and pintail portions may be deliberately separated.

References Cited in the file of this patent

UNITED STATES PATENTS

| | | |
|---|---|---|
| 1,018,741 | Davis | Feb. 27, 1912 |
| 1,172,825 | Oldroyd | Feb. 22, 1916 |
| 2,531,049 | Huck | Nov. 21, 1950 |
| 2,585,621 | Brandon | Feb. 12, 1952 |
| 2,751,806 | Dickie | June 26, 1956 |

FOREIGN PATENTS

| | | |
|---|---|---|
| 200,525 | Australia | Dec. 7, 1955 |